Nov. 10, 1942.     C. M. PETERS     2,301,319
PLUNGER
Filed Nov. 15, 1941

CLIFFORD M. PETERS
INVENTOR.

BY

ATTORNEYS

Patented Nov. 10, 1942

2,301,319

UNITED STATES PATENT OFFICE 2,301,319

PLUNGER

Clifford M. Peters, Greggton, Tex.

Application November 15, 1941, Serial No. 419,269

4 Claims. (Cl. 309—30)

This invention relates to a plunger and has for its general object the provision of an improved plunger for use in deep well pumps.

It is customary in a plunger of the type to which this invention relates to form the plunger of a metal or other strong support and to provide a seal between the body and the wall of the cylinder in which the plunger operates in the form of a ring or rings either of a soft packing material or of a hard metallic material. In such constructions, however, the load which is imposed on the plunger is taken entirely by one ring around the plunger. Various attempts have been made to distribute the load to a number of rings but these have not been successful, with the result that plungers for operation under very great loads have not proven successful.

It is an object of the present invention to provide a plunger in which the load will be distributed equally throughout a number of turns of packing material on a plunger.

Another object of this invention is to provide a structure in which there will be no tendency for the fluid being moved by the plunger to wash behind the packing or to tend to force the packing out of its seat in the groove on the plunger.

Another object of this invention is to provide a structure of the type referred to in which the packing material will be held inwardly in the groove in which it is seated so as to prevent any leakage of fluid behind the packing in its groove and prevent any looseness of the packing in its groove and consequent destruction or partial destruction of the packing in its movement in the cylinder.

Other objects and advantages of this invention will become apparent from the following description taken in connection with the accompanying drawing wherein is illustrated by way of example one embodiment of this invention.

Figures 1, 2:
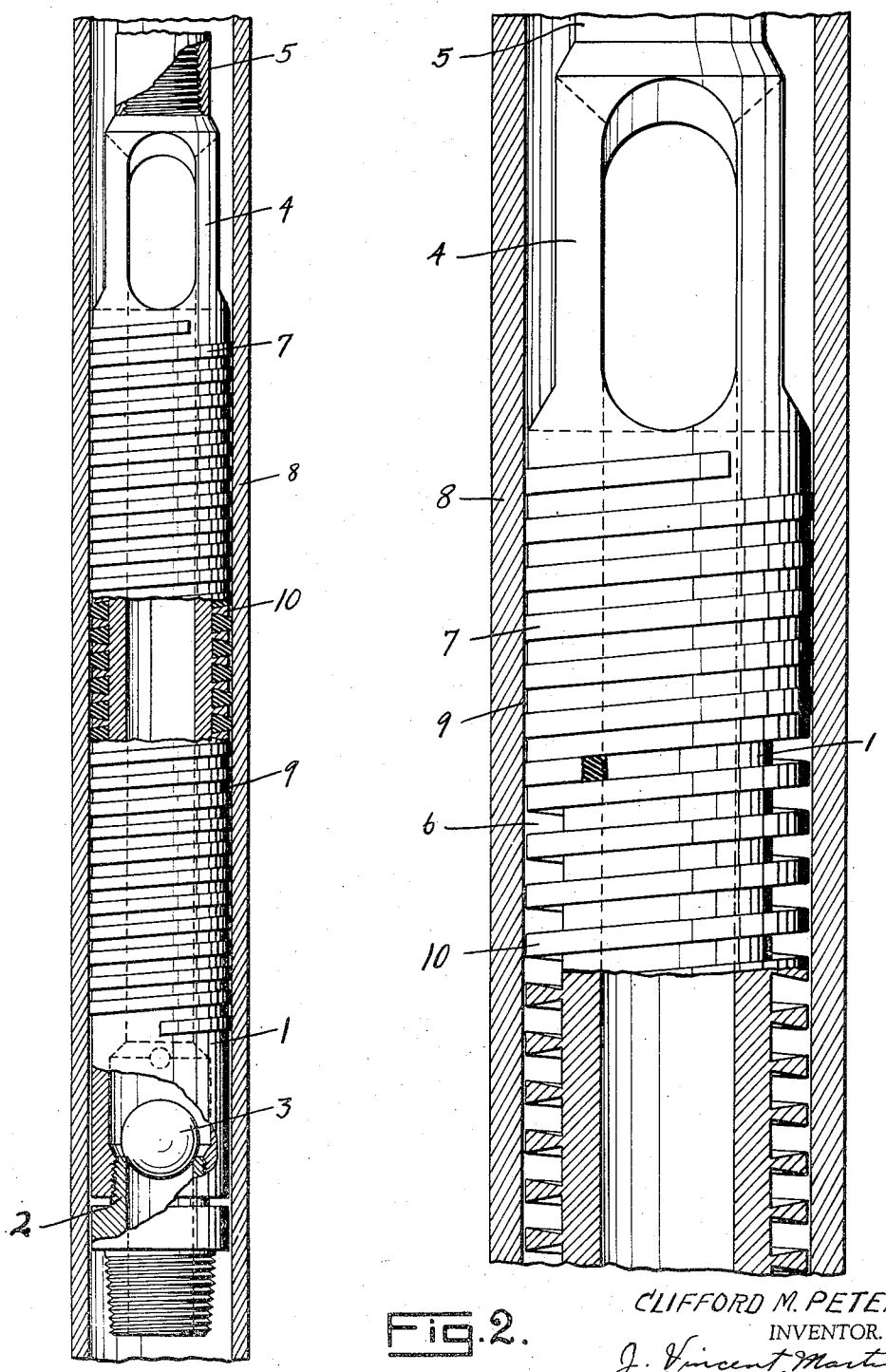
Fig. 1 is a view showing a side elevation of a plunger constructed in accordance with this invention in place within a cylinder, the cylinder being illustrated in vertical cross section and parts of the plunger being broken away and shown in section for purposes of illustration.
Fig. 2 is a view similar to Fig. 1 but on an enlarged scale and showing only a portion of the structure of Fig. 1, the parts shown being adjacent the upper end of the plunger.

Referring now more in detail to the drawing, the numeral 1 designates a tubular plunger body which is provided with a valve seat element 2 threaded into its lower end and adapted to receive a ball valve 3 or the equivalent thereof. This ball valve 3 is adapted to open upwardly upon the downstroke of the plunger to permit fluid to pass upwardly into and through the plunger, and the valve closes upon upstroke of the plunger so that the upstroke of the plunger will serve to elevate the column of liquid above the plunger.

The upper end of the plunger body is formed with a cage 4 having a threaded connection at its upper end to which the lower end of the pump rod 5 may be secured. This pump rod is reciprocated in the usual way during the operation of the pump, any selected and well known type of equipment for this purpose being employed at the surface of the ground. The openings through the cage 4 provide lateral communication from the interior of the hollow plunger to the exterior of the plunger above the main portion of the body and above that portion which is packed off against the cylinder walls.

The body 1 is provided with a continuous helical groove 6, this groove preferably having the same pitch throughout its length and extending from a point just below the cage 4 to a point near the lower end of the body. This groove is preferably of a nearly rectangular cross section but slightly wider adjacent its bottom than at the outer surface of the plunger body. That is, the groove is of a sort of dovetail cross section. A continuous packing strip 7 is seated in and tightly fits along both the sides and the bottom of this groove. It may be formed of any suitable composition material, and it will be seen that any swelling that tends to take place in this material will serve to bind the packing strip between the side walls of the groove in which it is mounted and will tend to force the packing strip the more tightly against the bottom of its groove. Thus, any tendency for leakage to be permitted behind the packing strip within its groove will be completely counteracted.

The radial thickness of the packing strip 7 is slightly greater than the depth of the groove 6 so that the packing will extend out beyond the body a very slight distance as shown in both Fig. 1 and Fig. 2. The outer contour of the body is of such a diameter that it closely approaches the inner diameter of the cylinder providing a fit with a very slight clearance between these parts. Indeed this clearance is made so slight in actual practice that the "skin effect" of the fluid in the space between the turns of the packing and between the body of the plunger and cylinder wall will produce a very high resistance to flow of this fluid through the spiral space between the turns of the spiralled packing. The working barrel of cylinder 8 is of the conventional type and its details have no bearing on this invention except in that the relation between its inner diameter and the outer diameter of the plunger body are so related as to produce the "skin effect" in the pumped fluid as above described.

A continuous helical channel 9 open at both ends and of a uniform width and thickness throughout its length is thus formed between the turns of the packing strip, the inner surface of the cylinder 8 and the outer surface of the rib 10 formed on the body of the groove 6. This channel extends throughout the major portion of the length of the plunger body. It is, however, much longer than if it extended in an axial direction along the plunger body and offers far greater resistance to the flow of fluid because of this length. At the same time, it will be appreciated that regardless of the amount of frictional or "skin effect" resistance there may be to the flow of fluid along this helical path, there will nevertheless be some flow of fluid, sufficient to produce a total "skin effect" or resistance to flow which will be equal to the load on the piston. This frictional or "skin effect" resisting flow through the helical path will be distributed evenly and equally throughout the entire length of the helical packing with the result that the axial load on the plunger will be distributed equally along the entire length and through the plurality of turns of the packing and no portion of the packing will be called upon to bear more than its proportionate share of the load on the piston.

The sand settling down from the fluid above will gradually collect in the channel 9 and will gradually work itself downwardly and outwardly thus freeing the plunger of sand and other abrasive matter.

When it becomes necessary to repack the plunger it may be withdrawn from the barrel and the packing unwound and a new packing strip wound into place without any considerable loss of time or without involving any considerable labor.

It will be noted that in this construction the packing material is of such a nature that it may be forced into and then caused to fit tightly within the slightly dove tail groove. Any of many well known packing materials may be employed for this purpose, the only requirement being that it be capable of being compressed sufficiently to permit it to be inserted into the groove after which it may expand to completely fill the groove. It is noted further that by virtue of the construction illustrated and described the fluid under pressure being moved by the plunger will not have an opportunity to pass around behind or act upon the rear face of the packing. On the other hand, the whole effect of this fluid, if it has any effect at all on the packing with respect to its groove, will be to seat the packing more firmly in its groove and prevent any leakage behind the packing. This is highly important in connection with a pump operating against such high heads as necessary in deep well practice of modern times.

While it has been stated that there is always a slight leakage under pressure past the piston through the helical path between the turns of packing, the clearance between the plunger and the cylinder wall will be designed so as to prevent this leakage from being substantial in volume but only permit enough leakage to clean the groove of any accumulation of sand or the like and produce a resistance to flow through the groove due to the "skin effect" of the fluid in the groove, which resistance will be equal to the load on the piston while the flow through the groove is still not substantial.

The amount of clearance allowed between the plunger and the cylinder wall will of course vary depending upon the nature of the fluid being pumped and the head against which the fluid is being pumped as well as by the length of the helical path provided by this clearance. Thus the clearance must be determined in each case by these factors in accordance with well known methods of computing the "skin effect" of the frictional resistance to flow through narrow channels, so that the total leakage will not exceed a predetermined desired maximum.

What I claim is:

1. A pump plunger for use in cylinders of deep well pumps comprising a cylindrical body having a continuous helical rib surrounding and projecting therefrom, said rib forming between its turns a continuous helical groove of uniform pitch throughout its length, a packing strip of compressible packing material seated in and tightly fitting said groove, said packing strip extending radially beyond the outer edge of said rib and forming therewith a continuous helical channel between the turns of said packing strip, the outer surfaces of said ribs and the inner surface of the pump cylinder, said channel being of uniform cross section throughout its length and being of such length and such restricted cross section that, with the liquid to be pumped, there will be skin effect resistance to flow but yet enough flow of liquid to maintain a total skin effect resistance to flow which will be equal to the load on the piston.

2. A pump plunger for use in cylinders of deep well pumps comprising a body having a continuous helical groove of constant pitch on its external surface and extending more than one turn about said body, and a continuous strip of compressible packing material in and substantially filling said groove and projecting from the bottom of the groove beyond the outer contour of said body to contact a cylinder wall and providing a helical passage fully open at both ends between the body, the cylinder wall and the convolutions of the strip of packing material, said helical passage being of such length and such restricted cross section that, with the liquid to be pumped, there will be skin effect resistance to flow but yet enough flow of liquid to maintain a total skin effect resistance to flow which will be equal to the load on the piston.

3. A pump plunger for use in cylinders of deep well pumps comprising a body having a continuous helical groove of constant pitch on its external surface and extending more than one turn about said body, said groove having substantially a dove tail cross section, and a continuous strip of compressible packing material in and substantially filling said groove and projecting from the bottom of the groove beyond the outer contour of said body to contact a cylinder wall and providing a helical passage fully open at both ends between the body, the cylinder wall and the convolutions of the strip of packing material, said helical passage being of such restricted cross section that, with the liquid to be pumped, there will be skin effect resistance to flow but yet enough flow of liquid to maintain a total skin effect resistance to flow which will be equal to the load on the piston.

4. A pump plunger for use in cylinders of deep well pumps comprising a cylindrical body having a continuous helical rib surrounding and projecting therefrom, said rib forming between its turns a continuous helical groove, a packing strip of compressible packing material seated in and tighly fitting said groove, said packing strip extending radially beyond the outer edge of said rib and forming therewith a continuous helical channel between the turns of said packing strip, the outer surfaces of said ribs and the inner surface of the pump cylinder, said channel being of uniform cross section throughout its length and being of such length and such restricted cross section that, with the liquid to be pumped, there will be skin effect resistance to flow but yet enough flow of liquid to maintain a total skin effect resistance to flow which will be equal to the load on the piston.

CLIFFORD M. PETERS.